United States Patent
Lin et al.

(10) Patent No.: US 10,826,316 B2
(45) Date of Patent: Nov. 3, 2020

(54) ELECTRICITY MANAGEMENT SYSTEM OF WIRELESS CHARGING AND METHOD THEREOF

(71) Applicant: GOLD CARBON CO., LTD., Taoyuan (TW)

(72) Inventors: Yeou-Fu Lin, Taipei (TW); Wen-Nien Liu, Taipei (TW)

(73) Assignee: GOLD CARBON CO., LTD., Taiwan (CN)

( * ) Notice: Subject to any disclaimer, the term of this patent is extended or adjusted under 35 U.S.C. 154(b) by 156 days.

(21) Appl. No.: 16/194,594

(22) Filed: Nov. 19, 2018

(65) Prior Publication Data

US 2019/0386505 A1    Dec. 19, 2019

Related U.S. Application Data

(60) Provisional application No. 62/684,598, filed on Jun. 13, 2018.

(51) Int. Cl.
*H02J 50/10* (2016.01)
*H02J 7/02* (2016.01)
(Continued)

(52) U.S. Cl.
CPC .............. *H02J 7/025* (2013.01); *H02J 50/10* (2016.02); *H04W 4/021* (2013.01); *H04W 12/06* (2013.01); *H04W 12/08* (2013.01); *H02J 7/00045* (2020.01)

(58) Field of Classification Search
CPC .. H02J 7/025; H02J 50/10; H02J 11/00; H02J 50/90; H02J 50/80; H02J 50/20; H04W 12/06; H04W 4/021; H04W 12/08
(Continued)

(56) References Cited

U.S. PATENT DOCUMENTS 5,963,012 A  * 10/1999  Garcia ................... H02J 50/80
                                                        320/106
6,275,681 B1 *  8/2001  Vega ..................... G06K 7/0008
                                                         455/41.1
(Continued)

FOREIGN PATENT DOCUMENTS

CN    107276254 A    10/2017
CN    107707041 A     2/2018
(Continued)

*Primary Examiner* — Robert Grant
*Assistant Examiner* — John T Trischler
(74) *Attorney, Agent, or Firm* — Li & Cai Intellectual Property (USA) Office (57) ABSTRACT

An electricity management method of wireless charging includes: detecting a charging request signal sent by a receiver device; selecting a transmitter device according to a location of the receiver device; detecting the location of the receiver device and a plurality of micro-electrometric wave charging environmental parameters thereof; collecting a strength distribution of a micro-electrometric wave signal frequency band in an area where the transmitter device is located, and transmitting area charging performance information based on the strength distribution of the micro-electrometric wave signal frequency band and area information of the area where the transmitter device is located; selecting one of the plurality of charging modes based on the charging request signal and the micro-electrometric wave charging environmental parameters; and based on the selected charging mode, controlling the transmitter device to turn on a charging function corresponding to the receiver device to charge the receiver device.

15 Claims, 6 Drawing Sheets

(51) Int. Cl.
  *H04W 12/06* (2009.01)
  *H04W 4/021* (2018.01)
  *H04W 12/08* (2009.01)
  *H02J 7/00* (2006.01)

(58) Field of Classification Search
  USPC .......................................... 320/108; 307/104
  See application file for complete search history.

(56) References Cited

U.S. PATENT DOCUMENTS

| | | | | |
|---|---|---|---|---|
| 6,943,666 | B2* | 9/2005 | Mooney | H02J 7/0045 307/10.3 |
| 8,390,249 | B2* | 3/2013 | Walley | H01M 2/0267 320/108 |
| 8,614,526 | B2* | 12/2013 | Cook | H01Q 1/248 307/104 |
| 8,716,977 | B2* | 5/2014 | Walley | H02J 50/10 320/108 |
| 8,760,113 | B2* | 6/2014 | Keating | H02J 50/12 320/108 |
| 8,952,655 | B2* | 2/2015 | Walley | H01M 10/44 320/108 |
| 9,047,759 | B2* | 6/2015 | Yamada | G08C 17/02 |
| 9,142,122 | B2* | 9/2015 | Oshima | G08C 17/02 |
| 9,184,632 | B2* | 11/2015 | Kirby | H02J 50/90 |
| 9,209,646 | B2 | 12/2015 | Kwan et al. | |
| 9,262,913 | B2* | 2/2016 | Yamada | G08C 17/02 |
| 9,312,728 | B2* | 4/2016 | Baarman | G06Q 30/0255 |
| 9,401,623 | B2* | 7/2016 | Walley | H02J 50/40 |
| 9,407,106 | B2* | 8/2016 | Redding | H01M 10/46 |
| 9,431,844 | B2* | 8/2016 | Redding | H02J 7/025 |
| 9,660,480 | B2* | 5/2017 | Yoon | H02J 50/80 |
| 9,672,393 | B1* | 6/2017 | Zhu | G06K 7/10326 |
| 9,766,674 | B2* | 9/2017 | Dunstan | G06F 13/385 |
| 9,876,387 | B2* | 1/2018 | Geiszler | H02J 7/025 |
| 9,876,889 | B1* | 1/2018 | Monnin | A63F 13/235 |
| 9,936,736 | B2 | 4/2018 | Cameron et al. | |
| 9,967,000 | B2* | 5/2018 | Chu | H02J 5/005 |
| 9,973,038 | B2* | 5/2018 | Li | H04B 5/0093 |
| 9,979,223 | B2* | 5/2018 | Redding | H04W 12/0609 |
| 10,049,517 | B2* | 8/2018 | Geiszler | H02J 7/025 |
| 10,193,390 | B2* | 1/2019 | Riehl | H02J 50/12 |
| 10,243,415 | B1* | 3/2019 | Grundmann | B60L 5/005 |
| 10,291,072 | B2* | 5/2019 | Chao | H02J 50/12 |
| 10,411,491 | B2* | 9/2019 | Liang | H02J 7/007 |
| 10,498,144 | B2* | 12/2019 | Leabman | H02J 50/20 |
| 2005/0127869 | A1* | 6/2005 | Calhoon | H02J 7/0068 320/108 |
| 2009/0058361 | A1* | 3/2009 | John | A61N 1/3787 320/128 |
| 2009/0156268 | A1* | 6/2009 | Kim | H02J 7/025 455/573 |
| 2010/0213895 | A1* | 8/2010 | Keating | H02J 7/0027 320/108 |
| 2010/0283599 | A1* | 11/2010 | Ma | A61B 34/74 340/539.1 |
| 2011/0043327 | A1* | 2/2011 | Baarman | G06Q 30/0261 340/5.8 |
| 2011/0127954 | A1* | 6/2011 | Walley | H02J 5/005 320/108 |
| 2011/0183683 | A1* | 7/2011 | Das | H04W 60/00 455/456.1 |
| 2012/0153894 | A1* | 6/2012 | Widmer | H02J 50/70 320/108 |
| 2012/0299391 | A1* | 11/2012 | Tanabe | H02J 7/025 307/104 |
| 2013/0033235 | A1* | 2/2013 | Fukaya | H02J 50/40 320/162 |
| 2013/0137376 | A1* | 5/2013 | Fitzgerald | H04W 12/1206 455/41.3 |
| 2013/0140906 | A1* | 6/2013 | Tanabe | H02J 50/12 307/104 |
| 2013/0154560 | A1* | 6/2013 | Walley | H02J 7/025 320/108 |
| 2013/0247117 | A1* | 9/2013 | Yamada | G08C 17/02 725/93 |
| 2013/0257364 | A1* | 10/2013 | Redding | H01M 10/46 320/108 |
| 2013/0257365 | A1* | 10/2013 | Redding | H02J 50/80 320/108 |
| 2014/0145675 | A1* | 5/2014 | Shimizu | H04B 5/0075 320/108 |
| 2014/0225560 | A1* | 8/2014 | Walley | H02J 50/40 320/108 |
| 2014/0361735 | A1* | 12/2014 | Li | H02J 50/12 320/108 |
| 2015/0028799 | A1* | 1/2015 | Kwan | H04B 5/0037 320/108 |
| 2015/0042265 | A1* | 2/2015 | Leabman | H02J 50/20 320/108 |
| 2015/0054458 | A1* | 2/2015 | Yoon | H02J 50/80 320/108 |
| 2015/0155739 | A1* | 6/2015 | Walley | H01M 10/44 320/108 |
| 2015/0288423 | A1* | 10/2015 | Chu | H02J 5/005 307/104 |
| 2015/0310736 | A1* | 10/2015 | Yamada | G08C 17/02 398/107 |
| 2015/0378409 | A1* | 12/2015 | Dunstan | G06F 13/385 713/310 |
| 2016/0020630 | A1* | 1/2016 | Tseng | H02J 50/80 320/108 |
| 2016/0099602 | A1* | 4/2016 | Leabman | H04B 5/0037 307/104 |
| 2016/0099613 | A1* | 4/2016 | Bell | H04B 1/3838 307/104 |
| 2016/0099614 | A1* | 4/2016 | Leabman | H01Q 1/248 307/104 |
| 2016/0099756 | A1* | 4/2016 | Leabman | H02J 50/20 307/104 |
| 2016/0099757 | A1* | 4/2016 | Leabman | H02J 50/23 307/104 |
| 2016/0191121 | A1* | 6/2016 | Bell | H02J 7/00045 307/104 |
| 2016/0254845 | A1* | 9/2016 | Iura | G06F 3/0488 455/41.2 |
| 2016/0261120 | A1* | 9/2016 | Riehl | H02J 50/12 |
| 2016/0292448 | A1* | 10/2016 | Motoyama | H04B 5/0062 |
| 2016/0322847 | A1* | 11/2016 | Geiszler | H04B 5/0093 |
| 2016/0365747 | A1* | 12/2016 | Redding | H04W 12/0609 |
| 2016/0380467 | A1* | 12/2016 | Shao | H04B 5/0037 320/108 |
| 2017/0066334 | A1* | 3/2017 | Sindia | H02J 7/0088 |
| 2017/0086503 | A1* | 3/2017 | Cameron | H01M 10/345 |
| 2017/0110910 | A1* | 4/2017 | Zeine | H02J 50/80 |
| 2017/0136883 | A1* | 5/2017 | Ricci | B60L 53/12 |
| 2017/0324278 | A1* | 11/2017 | Chao | H02J 50/40 |
| 2017/0331320 | A1* | 11/2017 | Geiszler | H04B 5/0093 |
| 2018/0012433 | A1* | 1/2018 | Ricci | G08G 1/096775 |
| 2018/0114389 | A1* | 4/2018 | Geiszler | H02J 7/025 |
| 2018/0159338 | A1* | 6/2018 | Leabman | H04B 5/0037 |
| 2018/0212451 | A1* | 7/2018 | Schmidt | H02J 50/10 |
| 2018/0241255 | A1* | 8/2018 | Leabman | H02J 50/23 |
| 2019/0006891 | A1* | 1/2019 | Park | H02J 50/80 |
| 2019/0020201 | A1* | 1/2019 | Liang | H02J 7/007 |
| 2019/0161860 | A1* | 5/2019 | Hsieh | C01B 32/198 |
| 2019/0386331 | A1* | 12/2019 | Lin | H01M 10/0525 |
| 2019/0386506 | A1* | 12/2019 | Lin | H02J 7/00712 |
| 2020/0006988 | A1* | 1/2020 | Leabman | H02J 50/20 |
| 2020/0119581 | A1* | 4/2020 | Kim | H02J 50/10 |

FOREIGN PATENT DOCUMENTS

| | | |
|---|---|---|
| TW | 201042884 A1 | 12/2010 |
| TW | 201138256 A1 | 11/2011 |
| TW | 201642210 A | 12/2016 |

* cited by examiner

ELECTRICITY MANAGEMENT SYSTEM OF WIRELESS CHARGING AND METHOD THEREOF

CROSS-REFERENCE TO RELATED PATENT APPLICATION

This application claims priority from the U.S. Provisional Patent Application Ser. No. 62/684,598 filed Jun. 13, 2018, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present invention relates to an electricity management system of wireless charging and a method thereof, and in particular, to an electricity management system using a cloud management system to implement charging and discharging via wireless micro-electrometric wave charging, and a method thereof.

BACKGROUND OF THE DISCLOSURE

In current wireless charging technology, a power supply apparatus (for example a charger) transfers energy to an electrical device (for example, a mobile device) by means of near-field induction, that is, inductive coupling. An operating principle of a wireless charger is as follows: according to Faraday's law of induction, a current passes through a coil to produce a new magnetic field, and variations in the new magnetic field result in an induced current which can be used for charging. The wireless charger uses a primary coil and a secondary coil to induce a current, to transfer energy from a transmitter to a receiver.

However, in the current wireless charging technology, an electromotive force can be induced only when the transmitter (the power supply apparatus) and the receiver (the electrical device) are close together or even attached to each other, causing inconvenience in use. In addition, for safety reasons, the wireless charging manner is unable to handle a charging operation with an excessively high load. That is, safe power supply must be ensured if many devices are simultaneously charged with a charging panel, otherwise the devices may be burnt or other risks may be incurred. Moreover, electromagnetic induction during wireless charging may interfere with other wireless devices.

Definitely, the wireless charging manner also includes electromagnetic resonance, which efficiently transfers the energy according to resonance at the same frequency at the transmit end and the receive end. Alternatively, a laser or luminous energy transmitted in a solar manner can also be used for charging. However, none of the foregoing methods is popularized, and it is further required to overcome many technical difficulties.

SUMMARY OF THE DISCLOSURE

In response to the above-referenced technical inadequacies, the present invention discloses an electricity management method of wireless charging, applicable to a charging mode using a cloud server to manage a receiver device, where the electricity management method includes: detecting and receiving, by the cloud server, a charging request signal sent by the receiver device; selecting a transmitter device according to a location of the receiver device; detecting, by an electricity management device, the location of the receiver device and a plurality of micro-electrometric wave charging environmental parameters thereof, where the plurality of the micro-electrometric wave charging environmental parameters includes at least micro-electrometric wave strength in an area where the receiver device is located and the number of other receiver devices which are being charged via a micro-electrometric wave in the area where the receiver device is located; collecting, by the transmitter device, a strength distribution of a micro-electrometric wave signal frequency band in an area where the transmitter device is located, and transmitting area charging performance information to the cloud server based on the strength distribution of the micro-electrometric wave signal frequency band and area information of the area where the transmitter device is located; generating, by the cloud server, charging mode selection information based on the charging request signal and the micro-electrometric wave charging environmental parameters, and transmitting it to the receiver device, where the charging mode selection information includes a plurality of charging modes for the receiver device to select therefrom, and the charging modes include at least a first charging mode and a second charging mode; selecting, by the receiver device, one of the charging modes, generating a selection signal and transmitting the selection signal to the cloud server; and receiving, by the cloud server, the selection signal, and controlling, according to the charging mode selected by the receiver device, the transmitter device to turn on a charging function corresponding to the receiver device so as to charge the receiver device.

The present invention further provides an electricity management system of wireless charging, where the electricity management system includes: a cloud server; a micro-electrometric wave signal transceiver, used to transmit a micro-electrometric wave signal; an electricity management device, used to charge a receiver device, the receiver device being used to collect and record user information, where the cloud server detects and receives a charging request signal sent by the receiver device, and selects the micro-electrometric wave signal transceiver according to a location of the receiver device; the electricity management device detects the location of the receiver device and a plurality of micro-electrometric wave charging environmental parameters thereof, where the plurality of the micro-electrometric wave charging environmental parameters includes at least micro-electrometric wave strength in an area where the receiver device is located and the number of other receiver devices which are being charged via a micro-electrometric wave in the area where the receiver device is located; the micro-electrometric wave signal transceiver collects a strength distribution of a micro-electrometric wave signal frequency band in an area where the transceiver is located, and transmits area charging performance information to the cloud server based on the strength distribution of the micro-electrometric wave signal frequency band and area information of the area where the transceiver is located; the cloud server generates charging mode selection information based on the charging request signal and the micro-electrometric wave charging environmental parameters, and transmits it to the receiver device, where the charging mode selection information includes a plurality of charging modes for the receiver device to select therefrom, and the charging modes include at least a first charging mode and a second charging mode; the receiver device selects one of the charging modes, generates a selection signal and transmits the selection signal to the cloud server; and the cloud server receives the selection signal, and controls, according to the charging mode selected by the receiver device, the micro-electrometric wave signal transceiver to turn on a charging function corresponding to the receiver device so as to charge the receiver device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which:

FIG. 3-1 and FIG. 3-2 are flowcharts of an electricity management method in the present invention.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure provides an electricity management system of wireless charging and a method thereof, which conduct wireless charging via a micro-electrometric wave. Thus, inconvenience of the prior art can be overcome, and by using multiple charging and discharging modes of the present invention, a power supply end and a receive end can be methodically and dynamically managed at the same time in high efficiency.

Figure 1:
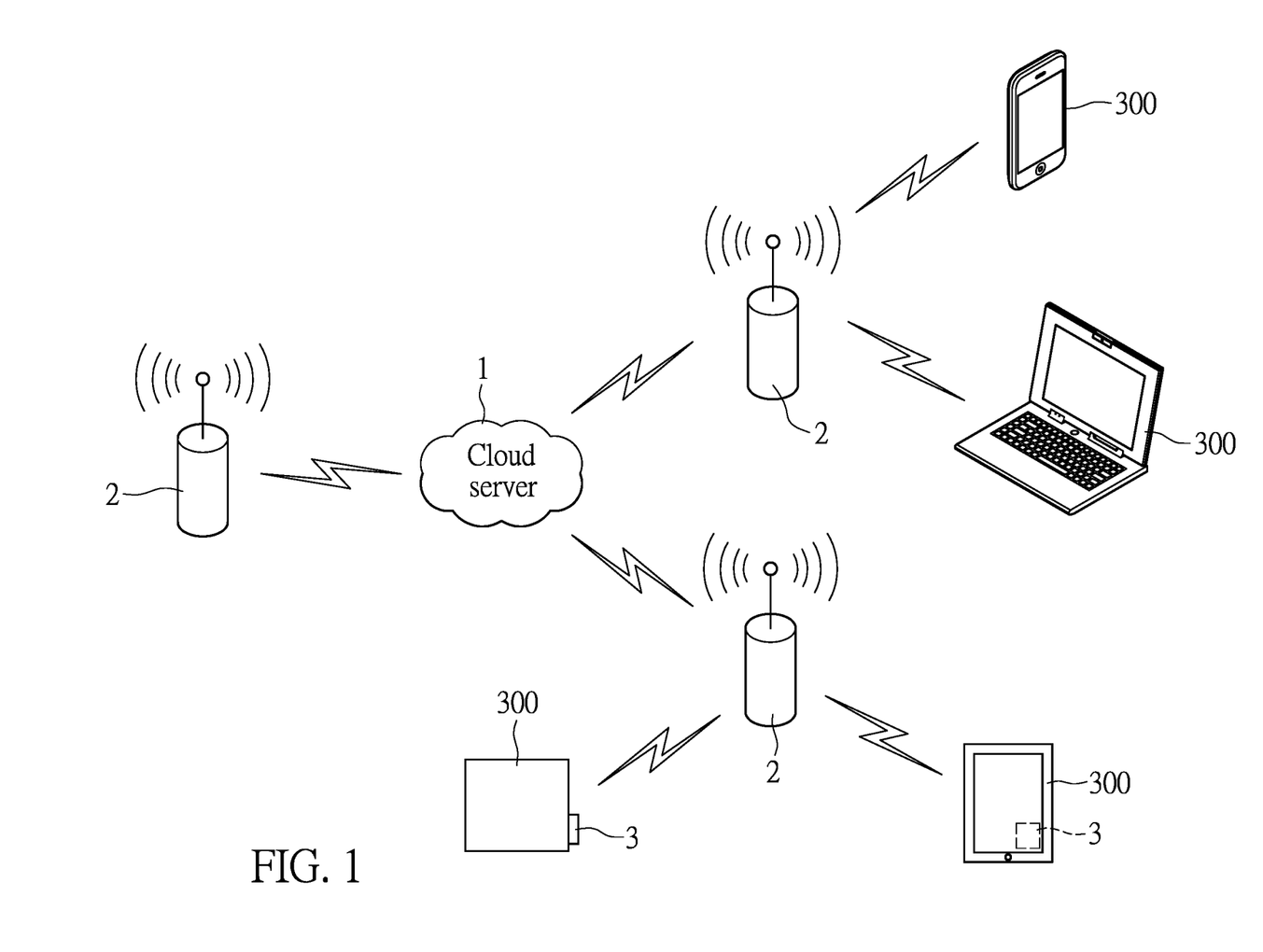
FIG. 1 is a block diagram of basic elements of an electricity management system of wireless charging according to the present invention.
Figure 2:
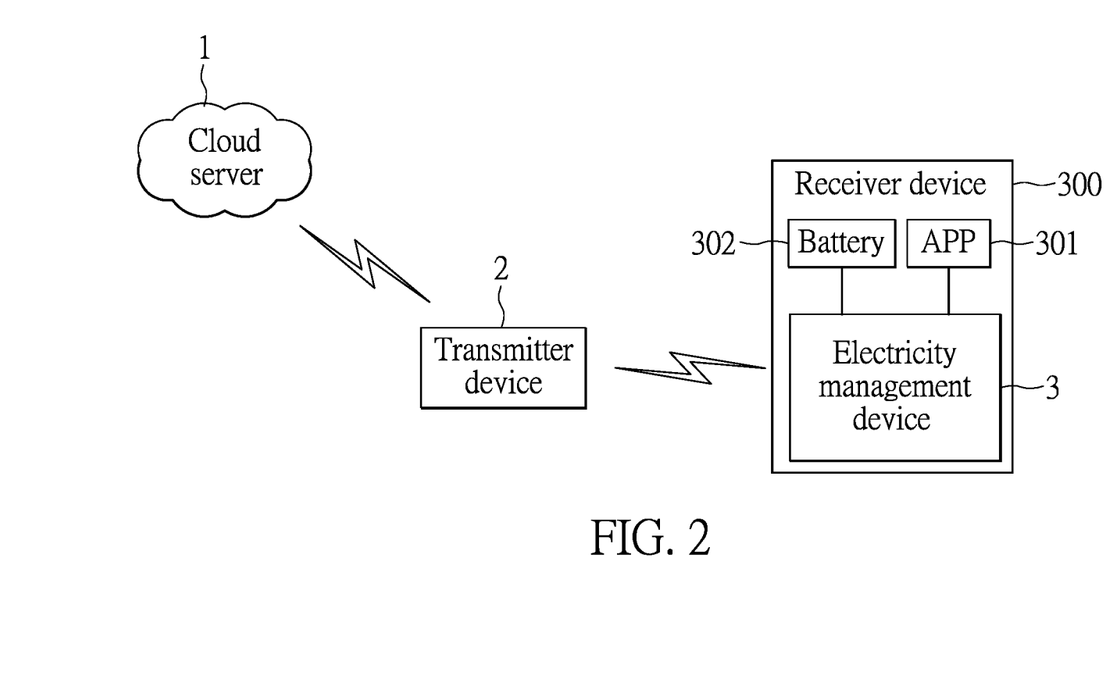
FIG. 2 is a simple block diagram showing that an electricity management device of the electricity management system is built in a portable device according to the present invention.

Referring to FIG. 1 and FIG. 2, an electricity management system of wireless charging of the present invention includes a cloud server 1, a plurality of transmitter devices 2 (that is, micro-electrometric wave signal transceivers) connected to the cloud server 1 in a telecommunication manner, and a plurality of electricity management devices 3 connected to the transmitter devices 2 in a telecommunication manner.

The electricity management device 3 of the present invention is disposed inside a receiver device 300 in the form of hardware, and used to charge a battery 302 in the receiver device 300, as shown in FIG. 2. The receiver device 300 may be a portable consumer electronic product such as a mobile phone, tablet computer, or notebook computer; or may also be a device that can be charged via a micro-electrometric wave, such as a wireless communication product, a GPS-related product, a Radio Frequency Identification (RFID) system, a special medical supply, a security-related product and emergency care product, a long-term nursing product, an emergency or backup power system, or a micro-electrometric wave charging system for medium and large power equipment; or definitely may generally refer to a manufacturer with the demand for micro-electrometric wave charging of the present invention. Therefore, the embodiments of the present invention are explained by using a mobile phone as an example, but are not limited thereto. It should be noted that, in other embodiments of the present invention, the electricity management device 3 may be independently designed and externally connected to the receiver device 300, such as external hardware (for example, an external wireless charging panel) self-developed or authorized after negotiation with a hardware manufacturer. The present invention does not impose any limitation on a set position of the electricity management device 3.

A micro-electrometric wave charging management application (APP) 301 is installed in the receiver device 300, and is used to collect and record user information. The user information includes at least one of registered account information, customer information, a use request, the location of the portable device, payment status information, spending habits, consumption records, and an area of interest (AoI). The micro-electrometric wave charging management APP 301 may transmit the user information to the transmitter device 2 and the cloud server 1 via the electricity management device 3. However, it should be noted that, in other embodiments of the present invention, the user information may also be obtained by using an internal database of the receiver device, a built-in APP, a cloud system, or other manners. Therefore, the present invention is not subjected to the foregoing limitative range.

Related software may cooperate with a Telecom or Netcom service provider, an APP developer, an Internet of Things (IoT)-related operator, a monitoring and charging system operator, a security and emergency care service provider, a long-term nursing service provider, a micro-electrometric wave charging system for medium and large power equipment, an emergency or backup power system established as a charging source, or an uninterrupted micro-electrometric wave collection system built in an urban densely-populated area scarce of micro-electrometric waves to constantly charge the emergency or backup power system, for emergency power needs. When the power recovery efficiency is high, the power system can even be fed, and the electric power user is charged according to a power generation amount. If the present invention is applied in an RFID system, an RFID antenna absorbs waves and charges a battery of the system, thus supplying power to a tag IC (and a sensor) and an RF transmitter at the same time. Therefore, the operation can be performed in a longer distance, achieving an active RFID effect. The present invention can be applied in the following application industries: medical service providers (for example, hospitals or clinics), fire and rescue equipment, renewable and green-energy service providers, power system operators, and logistics operators. Cooperative partners that can provide services may include: wireless communication operators, franchise chain operators, vending equipment, places where electricity is difficult to reach, mini-wisdom power grids, fixed-line system operators, electric vehicles, wearable devices, places requiring wireless charging (for example, mobile phones or notebook computers), and places using micro-electrometric wave charging (for example, pacemakers).

Figure 3A:
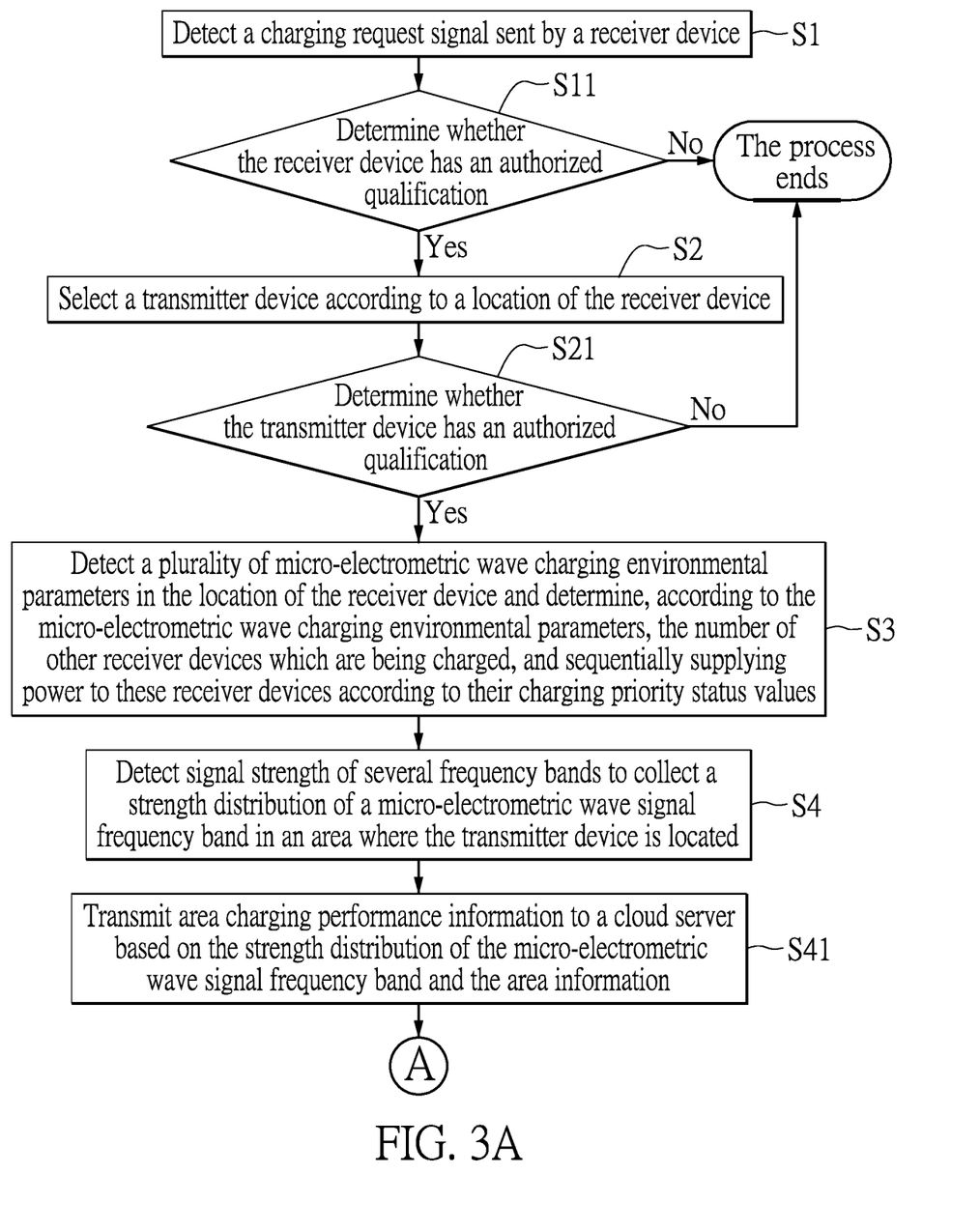
FIG. 3A and FIG. 3B are flowcharts of an electricity management method of wireless charging according to the present invention.
Figure 3B:
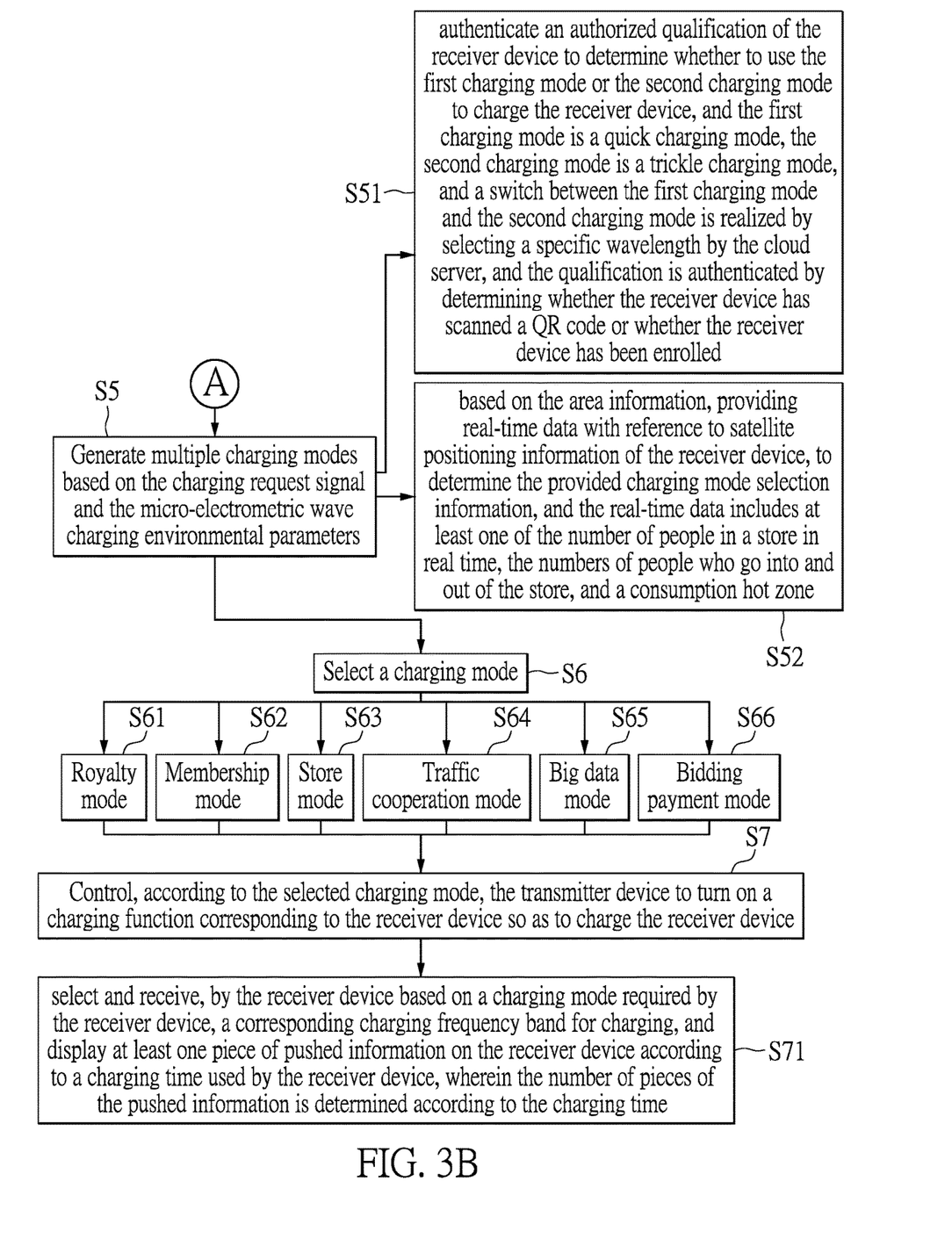
Figure 31:
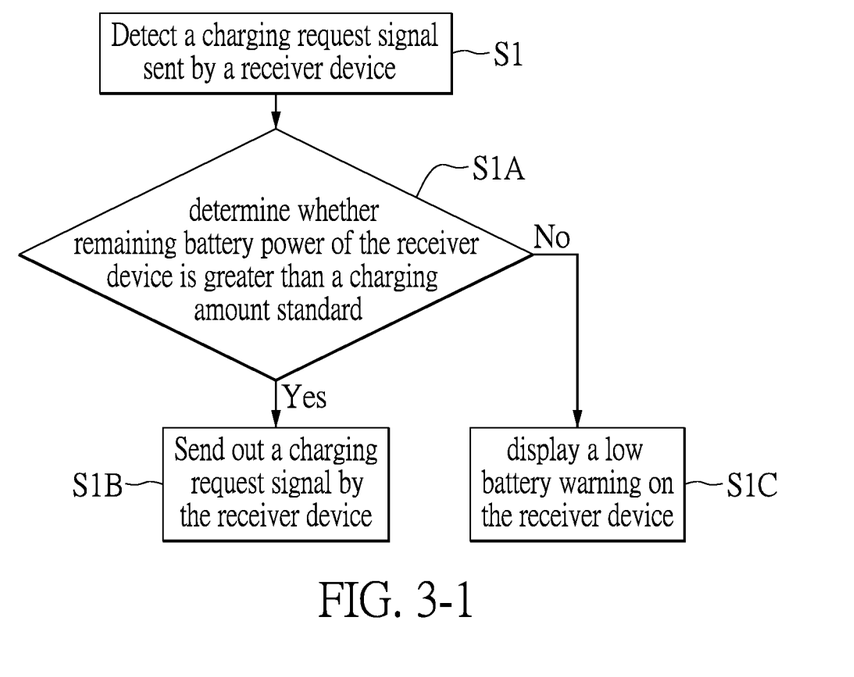

With reference to FIG. 3, a flowchart of an electricity management method of wireless charging of the present invention includes the following steps:

With reference to FIG. 3-1, Step S1: A cloud server 1 detects and receives a charging request signal sent by any receiver device 300. S1A: The cloud server 1 first determines whether remaining battery power of the receiver device 300 is greater than a charging amount standard. If yes, S1B: a user is allowed to send out a charging request signal whenever he/she wants to charge the device; or the user presets the receiver device 300 to a default micro-electrometric wave charging mode. In this way, the receiver device 300 is in a permanent charging request state, and subsequent steps are automatically performed when the receiver device 300 enters a micro-electrometric wave charging range, which is not limited by the present invention. However, S1C: if the cloud server 1 determines that the remaining battery power of the receiver device 300 is less than the charging amount standard, the cloud server 1 displays a low battery warning on the receiver device 300, so that the user timely charges the device.

Figure 32:
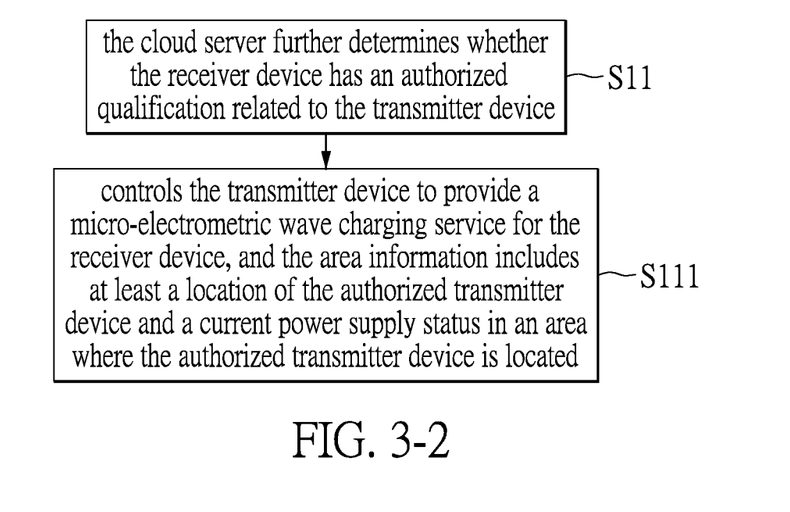

With reference to FIG. 3-2, Step S11: The cloud server 1 determines whether the receiver device 300 has an authorized qualification. The authorized qualification of the receiver device 300 indicates the following cases: S111: the receiver device 300 is a subscriber to an authorized Telecom operator capable of providing a micro-electrometric wave power supply service; the receiver device 300 is a member of a wireless micro-electrometric wave charging project; the receiver device 300 pays for a micro-electrometric wave charging service; the receiver device 300 uses a micro-electrometric wave charging service by watching pushed information (for example, commodity information); the receiver device 300 is located in a specific region (for example, in a physical store, a coffee shop, a medical institution, a public office, or the like); the receiver device 300 is a member of a specific shop (by, for example, scanning a QR code or logging on via the network); or the like. There are a lot of cooperation authorization manners, and the details are not described herein. The subsequent embodiments of the present disclosure will further describe in detail the electricity management method of wireless charging of the present invention in combination with several charging and discharging modes.

Step S2: The cloud server 1 selects a neighboring transmitter device 2 according to a location of the receiver device 300. The transmitter devices 2 of the present invention are access points (APs) of various types that can receive and send a micro-electrometric wave signal, such as an antenna, a base station, a router, a micro-electrometric wave signal transceiver, and the like. The transmitter device 2 only needs to wirelessly communicate with the cloud server 1, and receive and send a micro-electrometric wave signal. Therefore, the receiver device 300 may be independently built or an existing device is directly used as the receiver device 300, which is not limited by the present invention.

Step S21: The cloud server 1 determines whether the transmitter device 2 has an authorized qualification. The authorized qualification of the transmitter device 2 indicates the following cases: the transmitter device 2 is an authorized Telecom operator capable of providing a micro-electrometric wave power supply service; the transmitter device 2 is a member of a wireless micro-electrometric wave charging project; the transmitter device 2 pays for a micro-electrometric wave power supply service; the transmitter device 2 is located in a specific region (for example, in a physical store, a coffee shop, a medical institution, a public office, or the like); power supply of the transmitter device 2 is authorized in case of emergency; or the like. There are a lot of cooperation authorization manners, and the details are not described herein. The subsequent embodiments of the present disclosure will further describe in detail the electricity management method of wireless charging of the present invention in combination with several charging and discharging modes.

Step S3: The transmitter device 2 detects an area where the receiver device 300 is located and a plurality of micro-electrometric wave charging environmental parameters thereof, where the micro-electrometric wave charging environmental parameters include at least micro-electrometric wave strength in an area where the receiver device 300 is located, the number of receiver devices 300 which have made a request for micro-electrometric wave charging in the area where the receiver device 300 is located, and the number of other receiver devices 300 which are being charged via a micro-electrometric wave in the area where the receiver device 300 is located. It should be noted that, based on the micro-electrometric wave charging environmental parameters, a suitable charging mode can be more precisely determined with further reference to multiple pieces of area information and multiple pieces of real-time data provided through satellite positioning. The area information includes at least a location of the authorized transmitter device 2 and a current power supply status in the area where the authorized transmitter device 2 is located. It should be noted that, the area information also includes at least information about an authorized transmit spectrum in the area where the transmitter device 2 is located. Any transmit wave spectrum subsequently mentioned in the disclosure must belong to the authorized transmit spectrum in the area (especially, in a country) where the transmitter device 2 is located. The real-time data includes at least properties of a business district in which the receiver device 300 is located, the number of receiver devices 300 which are in a store in real time, and the numbers of receiver devices 300 which go into and out of the store. Based on the micro-electrometric wave charging environmental parameters detected by the transmitter device 2, the electricity management method of wireless charging of the present invention can adequately learn current charging statuses and charging request statuses of multiple receiver devices 300, and thus can precisely and conveniently manage and control charging/discharging of the whole system, so as to improve the efficiency of micro-electrometric wave charging. Moreover, because most of the receiver devices 300 are portable devices, it is difficult to know their real-time statuses. Therefore, the present invention can further adjust the charging and discharging operations for the receiver devices 300 in varied locations with reference to the real-time data.

Step S4: The transmitter device 2 detects signal strength of several frequency bands to collect a strength distribution of a micro-electrometric wave signal frequency band in the area where the transmitter device 2 is located. Step S41: The transmitter device 2 then transmits area charging performance information to the cloud server 1 based on the detected strength distribution of the micro-electrometric wave signal frequency band and the area information described above.

Step S5: The cloud server 1 generates charging mode selection information based on the charging request signal sent by the receiver device 300 and the micro-electrometric wave charging environmental parameters detected by the transmitter device 2 (or even with reference to the static area information and dynamic real-time data), and transmits it to the receiver device 300, where the charging mode selection information includes a plurality of charging modes for the receiver device 300 to select therefrom. The charging modes may be classified into the following types according to a charging action for the receiver device 300 and a power supply action of the transmitter device 2: a royalty mode, a membership mode, a store mode, a traffic cooperation mode, a big data mode, an advertising platform mode, and a bidding payment mode, but the present invention is not limited thereto. One or a combination of the charging modes described above may be provided, which will be described in detail in the subsequent embodiments. In Step S51, Charging modes actually received by the receiver device 300 include at least a first charging mode and a second charging mode. In the present invention, the first charging mode is quick charging and the second charging mode is trickle charging. It should be noted that, in the embodiments of the present invention, the quick charging mode needs to be charged or authorized, while the trickle charging mode is free. Quick charging or trickle charging for the receiver device 300 is realized by selecting a specific wavelength. Because the charging mode can be changed according to the preference, the present invention does not limit the selection among the charging modes.

Step S6: The user selects at least one of the charging modes, and then the receiver device 300 generates a selection signal and transmits it to the cloud server 1.

Step S7: The cloud server 1 controls, according to the selected charging mode, the transmitter device 2 to turn on a charging function corresponding to the receiver device 300 so as to charge a battery 302 of the receiver device 300. More specifically, the cloud server 1 determines the charging mode required by the receiver device 300; and further turns on the corresponding charging function of the receiver device 300 with reference to the user information, the suitable charging mode, the micro-electrometric wave charging environmental parameters, the area information, and the real-time data, so as to charge the built-in battery 302 of the receiver device 300. As described above, the electricity management device 3 of the receiver device 300 may be built in the receiver device 300 or externally connected thereto. The electricity management device 3 is used to store user information and user status information that are collected and recorded by the micro-electrometric wave charging management APP 301 in the receiver device 300, and transmit the foregoing information together with a charging request to the cloud server 1. The electricity management device 3 also has a function of filtering the received micro-electrometric wave signal and converting it into a direct current to charge the battery 302 in the receiver device 300. The user status information includes a location, a user request, device information, and provision of a user interface for a user to perform operations to send out the charging request. It should be noted that, the micro-electrometric wave charging management APP 301 may be default software embedded in the receiver device 300 by an equipment manufacturer in advance through application development; or may also be downloaded by the user from an application store (that is, the APP 301 is externally disposed). Then, the cloud server 1 charges the operating expenses. The present invention does not limit an acquisition manner of the micro-electrometric wave charging management APP 301.

Figure 4:
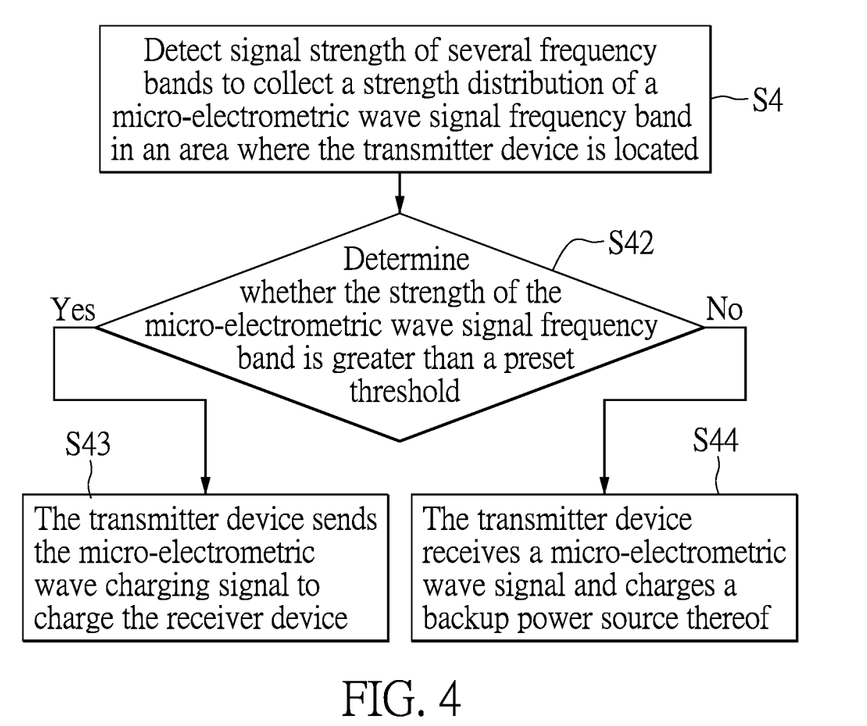
FIG. 4 is another flowchart of an electricity management method of wireless charging according to the present invention.

With reference to FIG. 4 in combination, an operation flowchart related to a power backup mode and a power supply mode of the transmitter device 2 in the electricity management method of wireless charging of the present invention further includes the following steps:

Step S4: The transmitter device 2 detects signal strength of several frequency bands to collect a strength distribution of a micro-electrometric wave signal frequency band in the area where the transmitter device 2 is located.

Step S42: The transmitter device 2 determines whether the detected strength of the micro-electrometric wave signal frequency band is greater than a preset threshold.

Step S43: If the transmitter device 2 determines that the detected strength of the micro-electrometric wave signal frequency band is greater than the preset threshold, the transmitter device 2 chooses to receive a micro-electrometric wave signal and charges a backup power source (not shown in the figure) of the transmitter device 2 by using the received micro-electrometric wave signal (the power backup mode).

Step S44: If the transmitter device 2 determines that the detected strength of the micro-electrometric wave signal frequency band is less than the preset threshold, the transmitter device 2 chooses to send a micro-electrometric wave charging signal in the backup power source to charge the receiver device 300 (the power supply mode). By a switch performed by the transmitter device 2 between the power backup mode and the power supply mode in the present invention, a high-strength micro-electrometric wave signal can be unceasingly provided to the receiver device 300, to improve the efficiency of micro-electrometric wave charging.

As described above, in addition to the micro-electrometric wave signal transceiver in the present invention, the transmitter device 2 may also be another device or an AP capable of detecting, and transmitting and receiving a micro-electrometric wave signal. Therefore, it should be noted that, in the present invention, the micro-electrometric wave signal transceiver may be independently disposed to perform signal transmission and receiving; or an existing device such as a router or an antenna may also be used to collect and transmit the micro-electrometric wave signal, to achieve an effect to be presented by the present invention. Definitely, due to the ability to perform a switch between the power backup mode and the power supply mode, the transmitter device 2 of the present invention can further cope with a long charging cycle of the receiver device 300, which is a preferred implementation means. However, in actual application, the present invention may also not be subjected to the conditions of setting the transmitted device 2 in consideration of costs.

The following embodiments describe several different forms of charging and discharging modes according to the disclosure of the present invention.

First Embodiment

A first charging and discharging mode regarding wireless charging of the present invention is a royalty mode, in which each transmitter device 2 and each receiver device 300 are charged royalties respectively for authorization of micro-electrometric wave power supply and authorization of micro-electrometric wave charging. The transmitter device 2 which is authorized to provide a micro-electrometric wave power supply service is allowed to supply power, and the receiver device 300 which is authorized to receive a micro-electrometric wave charging service is allowed to be charged. The transmitter device 2 is an AP of the present invention, which may be Wi-Fi, a Telecom operator, a base station, or various antennas. The receiver device 300 may be a portable device, such as a mobile phone, a notebook computer, or different kinds of mobile payment software. It should be noted that, if the Telecom operator serves as the authorized transmitter device 2, the Telecom operator may be charged a certain amount of royalties in advance, and then fees are charged according to trickle charging hours or quick charging hours within a period (for example, a month).

Second Embodiment

S71: A second charging and discharging mode regarding wireless charging of the present invention is a membership mode, in which based on a charging mode required by the receiver device 300, the receiver device 300 selects and receives a corresponding charging frequency band for charging, and enables locking of a specific wavelength. Selection between quick charging and trickle charging is made according to a payment amount, or free trickle charging is selected after advertisements are watched. Alternatively, fees are calculated according to a charging time used by the receiver device 300, or one or more advertisements are played back on the receiver device 300, where the number of the advertisements is determined according to the charging time.

Third Embodiment

A third charging and discharging mode regarding wireless charging of the present invention is a store mode, in which since the receiver device 300 is a member of a store or the user's spending amount in the store exceeds a determined amount, free trickle charging, free quick charging, or quick charging by payment is provided. The receiver device 300 may scan a QR code or register via the network to become a member of the store. In the store mode, the store may be charged a certain amount of royalties in advance, and then fees are charged according to trickle charging hours or quick charging hours within a period (for example, a month).

Fourth Embodiment

A fourth charging and discharging mode regarding wireless charging of the present invention is a traffic cooperation mode, in which a user (a potential consumer or a potential consumer group) is guided to a physical store according to advertising cooperation with a cooperative manufacturer (for example, an advertiser, a retailer or a physical channel), gets coupons from the manufacturer, and is provided with a free charging service. Distribution of profits from advertisement is then conducted between the store and the cooperative manufacturer.

Fifth Embodiment

A fifth charging and discharging mode regarding wireless charging of the present invention is a big data mode, in which consumer's spending habits can be learned according to accumulated big data (for example, the user information described above) by a virtual advertising platform cooperation mode (via the network or TV shopping), and an advertising bidding platform can be actively provided. Thus, a cooperative manufacturer can push advertisements to a locked customer group or a potential consumer group on the platform in a bidding manner, to realize consumption. Distribution of profits is then conducted with the cooperative manufacturer (for example, FaceBook).

In addition, in step S52: based on user information recorded in the receiver device 300 using micro-electrometric wave charging of the present invention, and with reference to area information (including a distribution of micro-electrometric wave strength and the number of receiver devices 300 which have made a request for micro-electrometric wave charging in the area where the receiver device 300 is located) stored in a database and real-time data (including dynamic information such as properties of a business district, the number of people in a store in real time, the numbers of people who go into and out of the store, an expense, and a consumption hot zone) provided through satellite positioning, an appropriate charging mode can be provided by a physical platform cooperation mode. In such a charging and discharging mode, relevant discount coupons provided by the cooperative manufacturer may be additionally used to promote sales. The distribution of profits may be conducted based on an actual transaction amount or the number of guided customers, to further charge advertising fees.

Sixth Embodiment

A sixth charging and discharging mode regarding wireless charging of the present invention is a bidding payment mode, in which the number of receiver devices 300 which have made a request for micro-electrometric wave charging is determined according to micro-electrometric wave charging environmental parameters, and power is supplied sequentially to the multiple receiver devices 300 according to their payment and bidding statuses. More specifically, a charging sequence of the multiple receiver devices 300 is determined according to received bidding prices.

Based on the foregoing embodiments, an electricity management method of wireless charging according to the present disclosure uses an Apache Spark framework in the cloud to perform analytical operation on data information, and develops absorption techniques of the micro-electrometric wave. Further, a fee-based service is enabled via a micro-electrometric wave charging management APP of the present invention (multiple sets of wave absorption systems or absorption-forced systems may be designed in hardware or software, so as to gain a use priority in the same region and maintain the wave strength at a certain degree), and authorization management is conducted in an ARM mode. Thus, the present invention can be applied in combination with the foregoing extended several charging and discharging modes.

To sum up, with the electricity management method of remote micro-electrometric wave charging of the present invention, multiple charging devices can be charged ceaselessly for a long time in the same period, and unnecessarily get close to a power supply device, thus avoiding interference between near-field electromagnetic waves. Moreover, the present invention can immediately perform a switch between charging and discharging modes by charging fees in the cloud. Therefore, compared with the traditional charging method, the electricity management method of wireless charging of the present invention can enable a user to immediately gain electricity more conveniently and is more practical in charging and discharging.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electricity management method of wireless charging, applicable to a charging mode utilizing a cloud server to manage a receiver device, wherein the electricity management method comprises:

detecting and receiving, by the cloud server, a charging request signal sent by the receiver device;

selecting a transmitter device according to a location of the receiver device;

detecting, by an electricity management device, the location of the receiver device and a plurality of micro-electrometric wave charging environmental parameters thereof, wherein the plurality of the micro-electrometric wave charging environmental parameters include at least micro-electrometric wave strength in an area where the receiver device is located and the number of other receiver devices which are being charged via a micro-electrometric wave in the area where the receiver device is located;

collecting, by the transmitter device, a strength distribution of a micro-electrometric wave signal frequency band in an area where the transmitter device is located, and transmitting area charging performance information to the cloud server based on the strength distribution of the micro-electrometric wave signal frequency band and area information of the area where the transmitter device is located;

generating, by the cloud server, charging mode selection information based on the charging request signal and the micro-electrometric wave charging environmental parameters, and transmitting the charging mode selection information to the receiver device, wherein the charging mode selection information includes a plurality of charging modes for the receiver device to select therefrom, and the charging modes include at least a first charging mode and a second charging mode;

selecting, by the receiver device, one of the charging modes, generating a selection signal and transmitting the selection signal to the cloud server; and receiving, by the cloud server, the selection signal, and controlling, according to the charging mode selected by the receiver device, the transmitter device to turn on a charging function corresponding to the receiver device so as to charge the receiver device;

wherein the transmitter detects signal strength of several frequency bands to collect a strength distribution of a micro-electrometric wave signal frequency band in an area where the transceiver is located; and transmitting, by the micro-electrometric wave signal transceiver, area charging performance information to the cloud server based on the strength distribution of the micro-electrometric wave signal frequency band and the area information; and if the strength distribution of the micro-electrometric wave signal frequency band is lower than a threshold, sending, by the micro-electrometric wave signal transceiver, a micro-electrometric wave charging signal to charge the receiver device, wherein the micro-electrometric wave signal transceiver provides a micro-electrometric wave charging signal of at least two frequency bands to charge the receiver device; or if the strength distribution of the micro-electrometric wave signal frequency band is higher than the threshold, receiving, by the micro-electrometric wave signal transceiver, a micro-electrometric wave signal and converting the micro-electrometric wave signal into a charging voltage, to charge a backup power source of the micro-electrometric wave signal transceiver.

2. The electricity management method of wireless charging of claim 1, wherein the area information includes information about an authorized transmit spectrum in the area where the transmitter device is located.

3. The electricity management method of wireless charging of claim 1, wherein the step of detecting, by the cloud server, whether the receiver device sends out the charging request includes:

collecting, by the receiver device, user status information, wherein the user status information includes at least one of a location, a use request, device information, and provision of a user interface for a user to perform operations to send out the charging request.

4. The electricity management method of wireless charging of claim 1, wherein the step of receiving, by the cloud server, the selection signal, and controlling, according to the charging mode selected by the receiver device, the transmitter device to turn on a charging function corresponding to the receiver device so as to charge the receiver device includes:

selecting and receiving, by the receiver device based on a charging mode required by the receiver device, a corresponding charging frequency band for charging; and displaying at least one piece of pushed information on the receiver device according to a charging time used by the receiver device, wherein the number of pieces of the pushed information is determined according to the charging time.

5. The electricity management method of wireless charging of claim 1, wherein the step of returning, by the cloud server according to the charging request, multiple charging modes to the receiver device for the receiver device to select therefrom includes: further determining the provided charging mode selection information based on user information, wherein the user information includes at least one of registered account information, customer information, a use request, the location of the receiver device, payment status information, spending habits, consumption records, and an area of interest (AoI).

6. The electricity management method of wireless charging of claim 1, wherein the cloud server further determines whether the transmitter device has an authorized qualification, and if yes, controls the transmitter device to supply power; the cloud server further determines whether the receiver device has an authorized qualification, and if yes, controls the receiver device to be charged, wherein the transmitter device is one of an access point (AP) and a base station, and the receiver device is one of a mobile device and a notebook computer.

7. The electricity management method of wireless charging of claim 1, wherein the step of determining, by the cloud server, a charging mode required by the receiver device, and turning on the corresponding charging function of the receiver device to charge a built-in battery of the receiver device includes:
determining, according to the micro-electrometric wave charging environmental parameters, the number of other receiver devices which are being charged, and sequentially supplying power to these receiver devices according to their charging priority status values.

8. The electricity management method of wireless charging of claim 1, wherein the cloud server further determines whether the receiver device has an authorized qualification related to the transmitter device; and if yes, controls the transmitter device to provide a micro-electrometric wave charging service for the receiver device, wherein the area information includes at least a location of the authorized transmitter device.

9. The electricity management method of wireless charging of claim 8, wherein the authorized qualification is related to remaining battery power; and before the receiver device sends out the charging request signal, the cloud server further determines whether the remaining battery power of the receiver device is greater than a charging amount standard; and if yes, allows the receiver device to send out the charging request signal, or if not, displays a low battery warning on the receiver device.

10. The electricity management method of wireless charging of claim 8, wherein the step of generating, by the cloud server, charging mode selection information based on the charging request signal and the micro-electrometric wave charging environmental parameters, and transmitting the charging mode selection information to the receiver device includes:
based on the area information, providing real-time data with reference to satellite positioning information of the receiver device, to determine the provided charging mode selection information, wherein the real-time data includes at least one of the number of people in a store in real time, the numbers of people who go into and out of the store, and a consumption hot zone.

11. The electricity management method of wireless charging of claim 1, wherein the step of receiving, by the cloud server, the selection signal, and controlling, according to the charging mode selected by the receiver device, the transmitter device to turn on a charging function corresponding to the receiver device so as to charge the receiver device includes:
authenticating an authorized qualification of the receiver device to determine whether to use the first charging mode or the second charging mode to charge the receiver device, wherein the authorized qualification includes a first-grade qualification and a second-grade qualification; and the transmitter device charges the receiver device with the first-grade qualification by using the first charging mode, and charges the receiver device with the second-grade qualification by using the second charging mode.

12. The electricity management method of wireless charging of claim 11, wherein the first charging mode is a quick charging mode, the second charging mode is a trickle charging mode, and a switch between the first charging mode and the second charging mode is realized by selecting a specific wavelength by the cloud server.

13. The electricity management method of wireless charging of claim 11, wherein the qualification is authenticated by determining whether the receiver device has scanned a QR code or whether the receiver device has been enrolled.

14. The electricity management method of wireless charging of claim 13, wherein
if the receiver device has scanned the QR code, determining that the receiver device has the first-grade qualification, otherwise determining that the receiver device has the second-grade qualification; or
if the receiver device has been enrolled, determining that the receiver device has the first-grade qualification, otherwise determining that the receiver device has the second-grade qualification.

15. An electricity management system of wireless charging, comprising:
a cloud server;
a micro-electrometric wave signal transceiver, used to transmit a micro-electrometric wave signal; and
an electricity management device, used to charge a receiver device, the receiver device being used to collect and record user information, wherein
the cloud server detects and receives a charging request signal sent by the receiver device, and selects the micro-electrometric wave signal transceiver according to a location of the receiver device,
the electricity management device detects the location of the receiver device and a plurality of micro-electrometric wave charging environmental parameters thereof, wherein the plurality of the micro-electrometric wave charging environmental parameters include at least micro-electrometric wave strength in an area where the receiver device is located and the number of other receiver devices which are being charged via a micro-electrometric wave in the area where the receiver device is located,
the micro-electrometric wave signal transceiver collects a strength distribution of a micro-electrometric wave signal frequency band in an area where the transceiver is located, and transmits area charging performance information to the cloud server based on the strength distribution of the micro-electrometric wave signal frequency band and area information of the area where the transceiver is located,
the cloud server generates charging mode selection information based on the charging request signal and the micro-electrometric wave charging environmental parameters, and transmits the charging mode selection information to the receiver device, wherein the charging mode selection information includes a plurality of charging modes for the receiver device to select therefrom, and the charging modes include at least a first charging mode and a second charging mode, the receiver device selects one of the charging modes, generates a selection signal and transmits the selection signal to the cloud server, and the cloud server receives the selection signal, and controls, according to the charging mode selected by the receiver device, the micro-electrometric wave signal transceiver to turn on a charging function corresponding to the receiver device so as to charge the receiver device;

wherein the transmitter detects signal strength of several frequency bands to collect a strength distribution of a micro-electrometric wave signal frequency band in an area where the transceiver is located; and transmitting, by the micro-electrometric wave signal transceiver, area charging performance information to the cloud server based on the strength distribution of the micro-electrometric wave signal frequency band and the area information; and if the strength distribution of the micro-electrometric wave signal frequency band is lower than a threshold, sending, by the micro-electrometric wave signal transceiver, a micro-electrometric wave charging signal to charge the receiver device, wherein the micro-electrometric wave signal transceiver provides a micro-electrometric wave charging signal of at least two frequency bands to charge the receiver device; or if the strength distribution of the micro-electrometric wave signal frequency band is higher than the threshold, receiving, by the micro-electrometric wave signal transceiver, a micro-electrometric wave signal and converting the micro-electrometric wave signal into a charging voltage, to charge a backup power source of the micro-electrometric wave signal transceiver.

* * * * *